(12) United States Patent
Hillis

(10) Patent No.: US 8,024,377 B2
(45) Date of Patent: Sep. 20, 2011

(54) ANTI-ITEM FOR DELETION OF CONTENT IN A DISTRIBUTED DATASTORE

(75) Inventor: W. Daniel Hillis, Encino, CA (US)

(73) Assignee: Applied Minds, LLC, Glendale, CA (US)

(*) Notice: Subject to any disclaimer, the term of this patent is extended or adjusted under 35 U.S.C. 154(b) by 0 days.

(21) Appl. No.: 12/815,156

(22) Filed: Jun. 14, 2010

(65) Prior Publication Data

US 2010/0312804 A1 Dec. 9, 2010

Related U.S. Application Data

(63) Continuation of application No. 11/177,789, filed on Jul. 8, 2005, now Pat. No. 7,774,308.

(60) Provisional application No. 60/636,822, filed on Dec. 15, 2004.

(51) Int. Cl.
*G06F 7/00* (2006.01)

(52) U.S. Cl. .......... 707/812; 707/803; 707/966
(58) Field of Classification Search .......... None
See application file for complete search history.

(56) References Cited

U.S. PATENT DOCUMENTS

| 7,281,024 B1 * | 10/2007 | Banerjee et al. | 707/623 |
| 7,774,308 B2 * | 8/2010 | Hillis | 707/622 |
| 2004/0177100 A1 * | 9/2004 | Bjorner et al. | 707/206 |
| 2005/0193024 A1 * | 9/2005 | Beyer et al. | 707/200 |

* cited by examiner

*Primary Examiner* — Vei-Chung Liang
(74) *Attorney, Agent, or Firm* — Michael A. Glenn; Glenn Patent Group

(57) ABSTRACT

The invention provides an efficient apparatus and method for deleting items within a distributed datastore. Deletion of items is accomplished using anti-items having the same structure as a conventional data item, but for a single tag, flag, or bit which indicates that it is an anti-item, wherein the single tag, flag, or bit but does not affect the location at which a data item or anti-item is ultimately stored within the datastore, thereby ensuring that, upon insertion, the anti-item reaches the same location or locations within the datastore as the original data item.

16 Claims, 3 Drawing Sheets

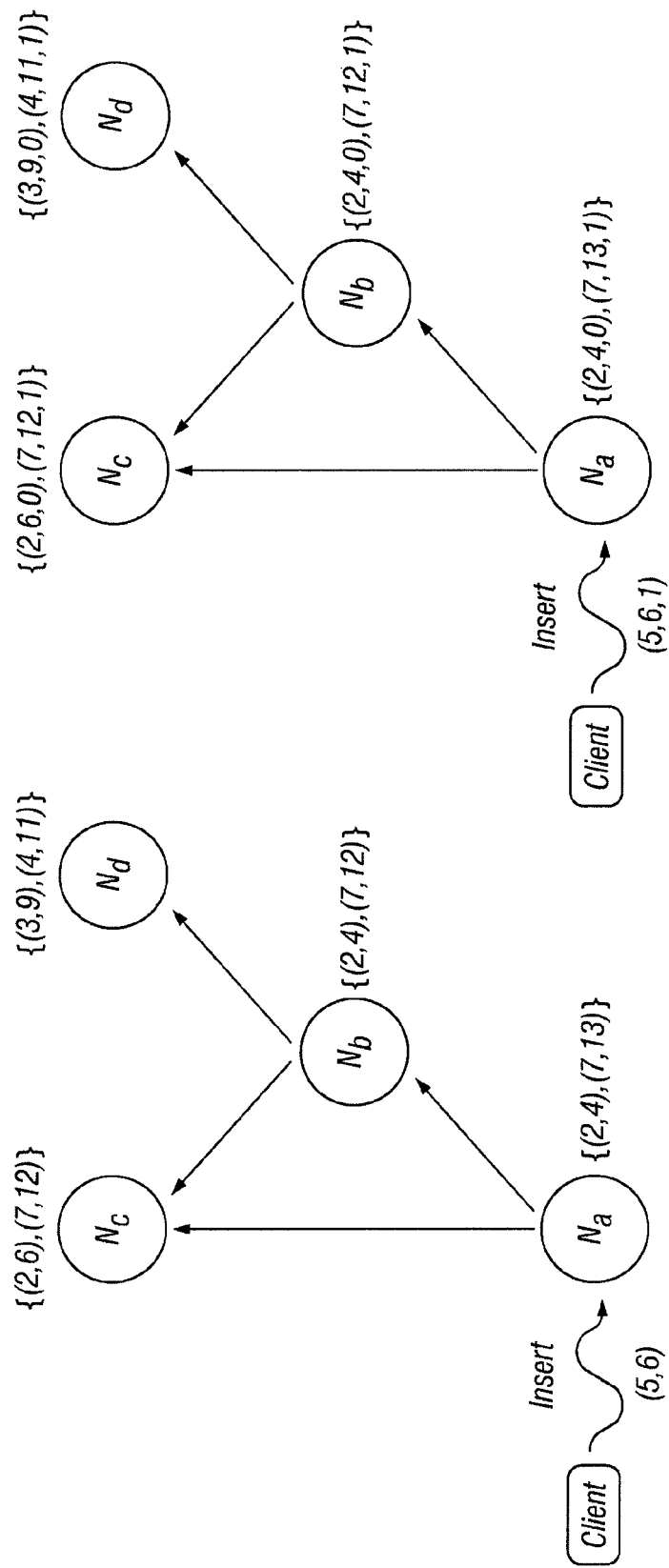

US 8,024,377 B2

ANTI-ITEM FOR DELETION OF CONTENT IN A DISTRIBUTED DATASTORE

CROSS REFERENCE TO RELATED APPLICATIONS

This application is a Continuation of U.S. patent application Ser. No. 11/177,789, filed on Jul. 8, 2005, now U.S. Pat. No. 7,774,308 which is entitled "Anti-Item for Deletion of Content In A Distributed Datastore" which claims priority to U.S. Provisional Patent Application Ser. No. 60/636,822 entitled "Method and Apparatus for Dynamically Generating Assertion-Based Presentations of Information", filed 15 Dec. 2004, each of which are incorporated herein in its entirety by this reference thereto.

BACKGROUND OF THE INVENTION

1. Technical Field

The invention relates to the storage of information. More particularly, the invention relates to an anti-item for deletion of content in a distributed datastore.

2. Description of the Prior Art

In recent years, the need for reliable and efficient storage of large amounts of complex data has increased dramatically. Indeed, the need for extensive storage seems to have outpaced the remarkable advances made in storage technology, e.g. the increasing capacity and decreasing cost of hard disks. As a result, storage of truly large amounts of data on a single server is in many cases impractical, and a distributed approach is desirable. Moreover, even in those cases where storage can be handled by a single machine, a distributed datastore may offer superior reliability and more efficient load handling.

In many distributed datastores, a single data item may be stored in one or more locations, i.e. on more than one server. In some such systems, the location(s) at which a data item is stored is determined by an insertion procedure in which the inserted item is propagated through a network of servers to the one or more servers that eventually store the data. Such an insertion procedure presents challenges if the need for deletion of data items arises because it may be inconvenient or computationally expensive to determine directly the locations at which a particular data item is stored.

It would be advantageous to provide an efficient apparatus and method for deleting items within a distributed datastore. In particular, it would be advantageous to provide an apparatus and method of deletion that uses an already well defined procedure for insertion of data.

SUMMARY OF THE INVENTION

The invention provides an efficient apparatus and method for deleting items within a distributed datastore. In particular, the invention provides an apparatus and method of deletion that uses an already well defined procedure for insertion of data.

BRIEF DESCRIPTION OF THE DRAWINGS

FIG. 5 is a block schematic diagram showing insertion of a tuple according to the invention; and FIG. 6 is a block schematic diagram showing insertion of an anti-tuple, i.e. deletion of a tuple, according to the invention.

DETAILED DESCRIPTION OF THE INVENTION

The invention facilitates the deletion of data items from a distributed datastore via the addition of anti-items using a standard data insertion procedure. Successful operation of the invention is possible in a datastore where:

The data insertion procedure is based upon the data item. Specifically, the location at which an inserted data item is ultimately stored is preferably consistent and is preferably based upon the properties of the inserted data item itself; and The data insertion procedure is essentially constant over time. Specifically, the result of the data insertion procedure, i.e. the location(s) to which the inserted item is propagated, is preferably the same when the anti-item is inserted as it was when the original data item was inserted. For purposes of this disclosure, the data insertion procedure also comprises any variant of the term "procedure", such as a process, algorithm, module, or mechanism. This understanding of the term "procedure" applies likewise to the deletion procedure discussed below.

The structure of an anti-item is the same as that of a conventional data item, but for a single tag, flag, or bit which indicates that it is an anti-item. Importantly, this additional tag does not affect the location at which a data item or anti-item is ultimately stored within the datastore. These properties ensure that, upon insertion, the anti-item reaches the same location or locations within the datastore as the original data item. After the anti-item has reached these locations, the data item is considered deleted. Deletion may entail the actual removal of both the data item and the anti-item from the datastore. Such annihilations may be executed upon arrival of the anti-item at the storage location or through a periodic, off-line garbage collection process. Alternatively, the anti-item may be forever stored alongside the data item. In this case, the presence of the anti-item alongside the data item excludes the data item from subsequent data retrieval operations.

Exemplary Distributed Datastore

The invention is more clearly understood through consideration of an exemplary distributed data-store that satisfies the above characteristics.

Datastore Structure

Figure 1:
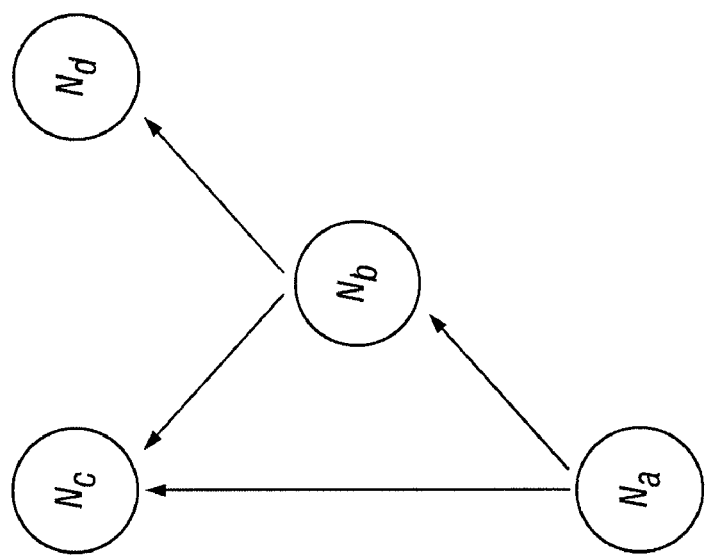
FIG. 1 is a block schematic diagram showing an exemplary distributed datastore according to the invention.

The exemplary datastore consists of multiple nodes connected in a directed, acyclic graph, as shown in FIG. 1, in which four interconnected nodes (Na, Nb, Nc, and Nd) are illustrated. Storage of data occurs at nodes, which are preferably servers with caching or hard disk data storage capabilities, or a combination thereof.

A particular installation of the datastore is characterized by a key list containing N keys. Each key within the key list is defined by an ordered list of values vi and an integer k. The integer represents the position of the key within the key list. A key may thus be expressed as $$Kk = \{v1, v2, \ldots, vi, \ldots, vMk\}. \quad (1)$$

Here, M denotes the number of values within the key. In many instances, the ordered list of values is simply a range of integers. For example, a key may be the defined as the integers between 1 and 10, inclusive. That is, $$Kx=[1,10]. \quad (2)$$

Data items within the datastore take the form of tuples of length N, expressed as $$I=(k1, k2, \ldots, kj, \ldots, kN), \quad (3)$$

where kj are key values, selected from the jth key within the key list. Thus, for a key list S defined as $$S=\{K1,K2\}=\{[2,7],[4,13]\}, \quad (4)$$

and one possible tuple is $$I=(3,8). \quad (5)$$

A key range is a contiguous subset of the indices into the ordered list of values that define a key. A key range is expressed as a pair of integers representing the ends of the range, inclusive. That is, $$r=[imin,imax]. \quad (6)$$

The storage duties of each node within the datastore are defined by a hosting range. A hosting range is a set of N key ranges that defines a subset of all tuples that can be expressed using the key list. For example, for the key list of Equation (4), the hosting range $$H=\{[2,3],[9,10]\} \quad (7)$$

indicates that the node is responsible for storing tuples [2, 9], [2, 10], [3, 9], and [3, 10]. As noted, the storage duties may be fulfilled using a combination of caching and disk storage. Alternatively, and more conveniently, a hosting range may be expressed using a set of tuples defining the corners of the covered region. For example, the hosting range of Equation (7) may be expressed as $$H=\{(2,9),(3,10)\}. \quad (8)$$

Figure 2:
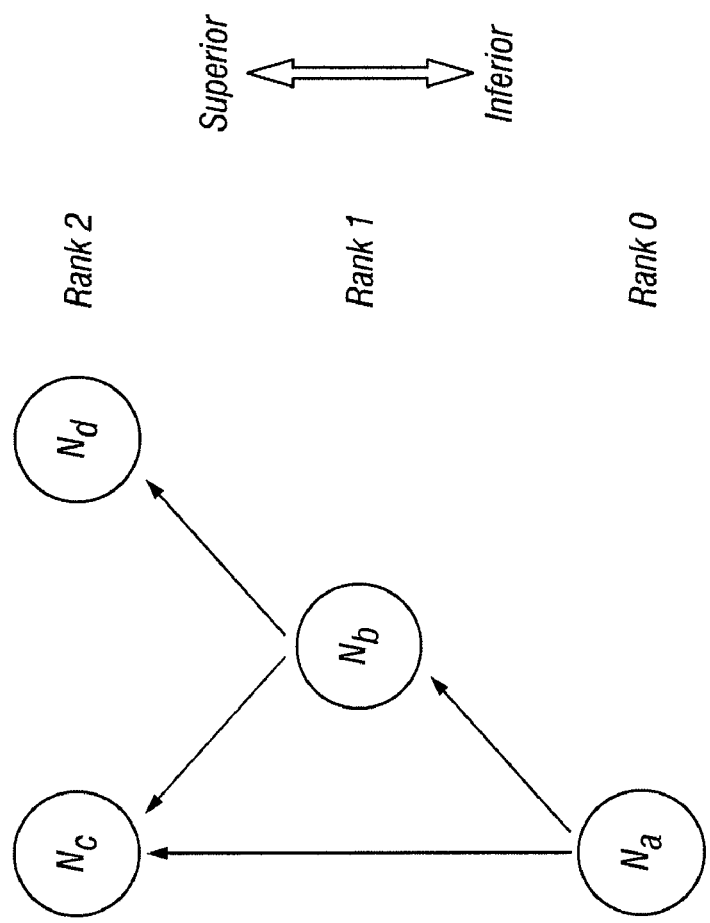
FIG. 2 is a block schematic diagram showing superior and inferior nodes, and a sense of upstream and downstream according to the invention.

As illustrated in FIG. 2, nodes may be characterized by a rank. Nodes having a lower rank are termed inferior, and nodes having a higher rank are termed superior. Nodes may only seek data from superior nodes, as indicated by the direction of the arrows. That is, requests for data may be passed to superior nodes but may not be passed to inferior nodes.

The coverage of a node is the union of the tuples within its hosting range and the tuples within the hosting ranges of the superior nodes to which it is connected. To facilitate this calculation, a node advertises its coverage to the inferior nodes to which it is connected. In the simplest embodiments of the invention, an administrator configures the network of nodes, explicitly indicating the connectivity between nodes, and the hosting ranges of each, and this calculation must be performed once upon system configuration. In more sophisticated distributed datastores, though, the connectivity of nodes and the hosting ranges of the nodes may be adjusted dynamically in response to measured system loads. In such systems, the advertising of coverage occurs on an ongoing basis.

A node has full coverage when its coverage contains all tuples that may be specified with the key list. For any tuple, a node with full coverage either hosts the tuple itself, or is connected to a superior node that advertises coverage for the tuple. By definition, a node is of rank zero if and only if it has full coverage.

Figure 4:
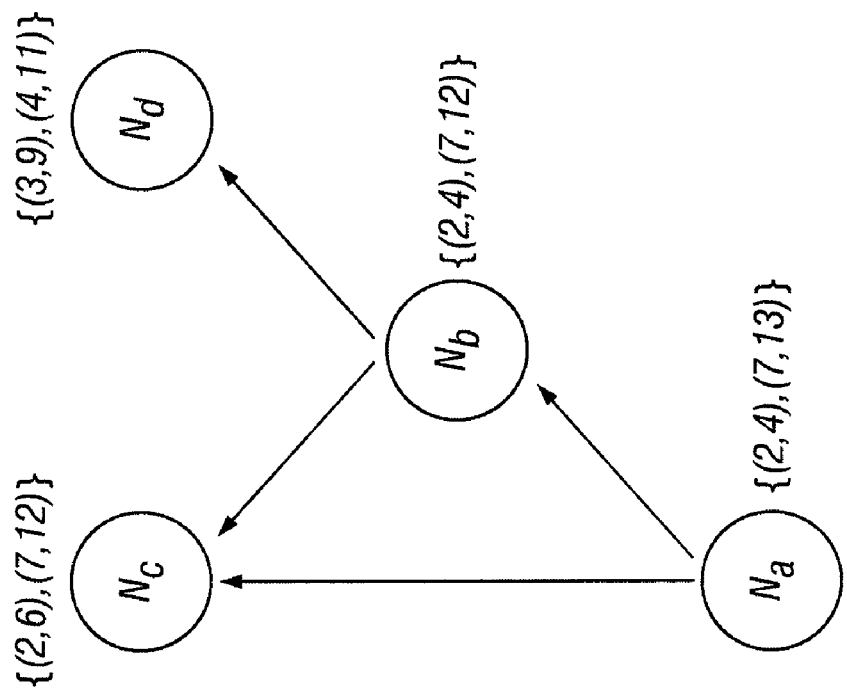
FIG. 4 is a block schematic diagram showing coverages of the nodes according to the invention.
Figure 3:
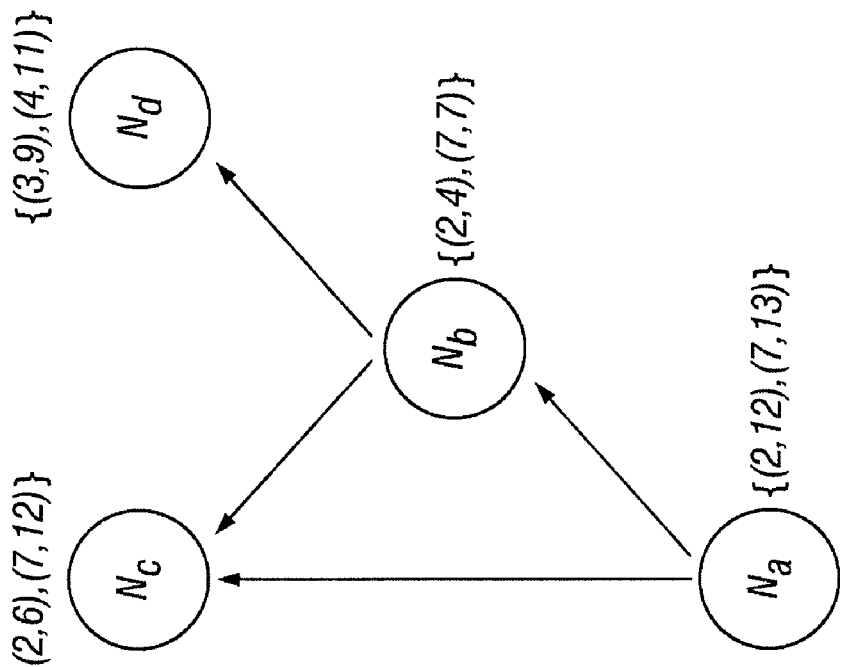
FIG. 3 is a block schematic diagram showing hosting ranges of the nodes according to the invention.

FIG. 3 shows a set of possible hosting ranges for the distributed datastore of FIG. 1 with the key list of Equation (4). The resulting coverages are shown in FIG. 4.

Insertion Procedure

Insertion of data into the datastore is performed by a client that connects to the datastore. Instructions to insert data are only passed from inferior nodes to superior nodes. Thus, to ensure that any tuple within the key list can be inserted properly, it is required that the client connect only to nodes of rank zero.

FIG. 5 shows an example of the data insertion procedure in which the client inserts the tuple (5, 6) at node Na. Because node Na is of rank zero, the inserted tuple is within its coverage. However, the inserted tuple is not within the hosting range of node Na, so node Na does not store the tuple locally. Node Na then considers the coverage of the superior nodes to which it is connected and passes the insertion request to those superior nodes that provide coverage for the inserted tuple. In this case, both Nb and Nc and provide coverage for the tuple (5, 6). Node Nb receives the insertion request. The inserted tuple is within the hosting range of node Nb, so node Nb stores the tuple locally. After storing the tuple locally, node Nb considers the coverage of the superior nodes to which it is connected. The inserted tuple is within the coverage of node Nc but not within the coverage of node Nd. Node Nb therefore passes the insertion request to node Nc but not to node Nd.

Thus, node Nc receives two insertion requests for the tuple (5, 6). Upon receipt of the first insertion request, node Nc determines that the tuple is within its hosting range. The tuple is therefore stored locally. Upon receipt of the second insertion request, node Nc again determines that the tuple is within its hosting range. However, it then notes that the tuple is already within its local storage and therefore ignores the second insertion request. Because node Nc is not connected to any superior nodes, the insertion procedure then terminates.

Deletion Procedure

The deletion procedure of the current invention is preferably implemented within the exemplary datastore through the addition of a deletion key to the key list. Specifically, the key list is defined as $$S=\{K1,K2,Kd\}=\{[1,5],[6,15],[0,1]\}. \quad (9)$$

The deletion key Kd is added solely to differentiate tuples from anti-tuples, i.e. items from anti-items. Tuples are of the form (a, b, 0), and all anti-tuples are of the form (c, d, 1). The deletion key is not used to determine where within the datastore a particular tuple is stored. Thus, in the current example all nodes have a hosting range of the form $$H=\{(t,v,0),(u,w,1)\}. \quad (10)$$

That is, all nodes store both tuples and anti-tuples.

As described above, anti-items may be designated in a number of different ways. The inclusion of an additional key within the key list is merely a particularly convenient and elegant way of denoting an anti-tuple in the present example. Other possibilities include appending a flag to the data item, or modifying a value within meta-data associated with the data item.

FIG. 6 shows an example of a deletion operation that is intended to delete the item inserted in FIG. 5. The deletion procedure is highly analagous to the insertion procedure. A client connects to the only node of rank zero, and requests deletion of the tuple (5, 6, 0). This is accomplished by inserting the corresponding anti-tuple (5, 6, 1). The coverage values shown have been altered from FIG. 5 to reflect the inclusion of the additional key within the key list. Similarly, the tuple inserted in FIG. 5 is assumed to have been of the form (5, 6, 0).

The insertion of the anti-tuple proceeds as the insertion of the tuple in FIG. 5. Thus, the anti-tuple (5, 6, 1) arrives for storage at nodes Nb and Nc. Arrival of the anti-tuple at the same location as the tuple results in deletion of the tuple. As noted above, deletion may entail the actual removal of the tuple from storage, which may be performed in several ways. Most simply, upon storage of an anti-tuple the storing node checks for the presence of the corresponding tuple. If the corresponding tuple is present, it is removed from storage. Alternatively, the anti-tuple may be stored alongside the tuple, and optionally removed at a later time through a garbage collection process. In this approach, or in another alternative approach in which the tuple is stored indefinitely, the presence of the anti-tuple alongside the tuple results in the exclusion of the tuple from any subsequent data retrieval operations.

Wildcard Key Values

Finally, the specification of an anti-tuple may also allow for a wild card or "don't care" key value for one or more of the keys. For example, the insertion procedure propagates the anti-tuple (3, *, 1) to all nodes with a hosting range encompassing a key value of 3 for the first key. Arrival at these nodes results in the deletion of all tuples of the form (3, k2, 0), where k2 is a any key value selected from the key K2. Thus, in the network of FIG. 4, the tuple is propagated to and delete any matching tuples stored at nodes Nb and Nd.

The symmetry of the insertion and deletion procedure suggests that a wild card key value could also be used in the insertion process. After insertion, a tuple containing a wild card is propagated to all nodes for which the explicitly specified key values are within the hosting range. Upon arrival at these hosting nodes, all tuples within the node's hosting range that match the tuple containing the wild card are stored. This operation results in a broad insertion.

Although the invention is described herein with reference to the preferred embodiment, one skilled in the art will readily appreciate that other applications may be substituted for those set forth herein without departing from the spirit and scope of the present invention. For example, the various operations and procedures disclosed herein may be effected by any of software, hardware, and combinations thereof.

Accordingly, the invention should only be limited by the Claims included below.

The invention claimed is:

1. A method for excluding a first tuple from subsequent data retrieval operations operating on a distributed datastore comprising a plurality of storage locations, comprising the steps of:
propagating said first tuple from a client to at least one destination among said plurality of storage locations using an insertion procedure; and
propagating a second tuple from the client, distinct from said first tuple, to each of said at least one destination using said insertion procedure;
excluding said first tuple from subsequent data retrieval operations upon arrival of said second tuple at said at least one destination,
wherein each of said first tuple and said second tuple comprise a plurality of key values, one key value for each of a plurality of keys,
wherein said insertion procedure operates based on a subset of said keys,
wherein said first tuple and said second tuple have equal key values for each key within said subset of keys;
whereby said insertion procedure ensures that said second tuple arrives at each of said at least one destination,
wherein said first tuple and said second tuple comprise a binary indicator in the form of a deletion key,
wherein a key value of said deletion key distinguishes said first tuple and said second tuple from one another, and
wherein said deletion key is not within said subset of keys.

2. The method of claim 1, wherein said key values are numeric.

3. The method of claim 1, wherein said second tuple comprises a wild card key value corresponding to any and all valid key values.

4. The method of claim 1, further comprising the step of:
removing said first tuple and said second tuple from said distributed datastore immediately upon arrival of said second tuple at said at least one destination.

5. The method of claim 1, further comprising the step of:
executing an online garbage collection process to remove said first tuple and said second tuple from said distributed datastore substantially after arrival of said second tuple at said at least one destination.

6. A non-transitory computer-readable medium containing executable instructions, that when executed by a hardware processor, perform the method of claim 1.

7. A system for excluding a first tuple from subsequent data retrieval operations operating on a distributed datastore comprising:
one or more hardware processors operatively coupled with said distributed datastore, wherein said distributed datastore comprises a plurality of storage locations,
at least one hardware processor, selected from among said one or more processors, configured for propagating said first tuple from a client to at least one destination among said plurality of storage locations using an insertion procedure; and
at least one hardware processor, selected from among said one or more processors, configured for propagating a second tuple from the client, distinct from said first tuple, to each of said at least one destination using said insertion procedure;
at least one hardware processor, selected from among said one or more processors, configured for excluding said first tuple from subsequent data retrieval operations at said at least one destination,
wherein each of said first tuple and said second tuple comprise a plurality of key values, one key value for each of a plurality of keys,
wherein said insertion procedure operates based on a subset of said keys,
wherein said first tuple and said second tuple have equal key values for each key within said subset of keys;
whereby said insertion procedure ensures that said second tuple arrives at each of said at least one destination,
wherein said first tuple and said second tuple comprise a binary indicator in the form of a deletion key,
wherein a key value of said deletion key distinguishes said first tuple and said second tuple from one another, and
wherein said deletion key is not within said subset of keys.

8. The system of claim 7, wherein said key values are numeric.

9. The system of claim 7, wherein said second tuple comprises a wild card key value corresponding to any and all valid key values.

10. The system of claim 7, wherein at least one hardware processor, selected from among said one or more hardware processors, is further configured for removing said first tuple and said second tuple from said distributed datastore immediately upon arrival of said second tuple at said at least one destination.

11. The system of claim 7, wherein at least one hardware processor, selected from among said one or more hardware processors, is further configured for executing an online garbage collection process to remove said first tuple and said second tuple from said distributed datastore substantially after arrival of said second tuple at said at least one destination.

12. A distributed datastore comprising:

at least one hardware processor, selected from among one or more hardware processors, configured for propagating a first tuple from a client, using an insertion procedure, to at least one destination among a plurality of storage locations within said distributed datastore; and at least one hardware processor, selected from among one or more hardware processors, configured for propagating a second tuple from the client, distinct from said first tuple, to each of said at least one destination using said insertion procedure; and wherein each of said first tuple and said second tuple comprise a plurality of key values, one key value for each of a plurality of keys, wherein said insertion procedure operates based on a subset of said keys, wherein said first tuple and said second tuple have equal key values for each key within said subset of keys;

whereby said insertion procedure ensures that said second tuple arrives at each of said at least one destination, wherein said distributed datastore excludes said first tuple from subsequent data retrieval operations operating on said distributed datastore, wherein said first tuple and said second tuple comprise a binary indicator in the form of a deletion key, wherein a key value of said deletion key distinguishes said first tuple and said second tuple from one another, and wherein said deletion key is not within said subset of keys.

13. The datastore of claim 12, wherein said key values are numeric.

14. The datastore of claim 12, wherein said second tuple comprises a wild card key value corresponding to any and all valid key values.

15. The datastore of claim 12, wherein at least one hardware processor, selected from among said one or more hardware processors, is further configured for removing said first tuple and said second tuple from said distributed datastore immediately upon arrival of said second tuple at said at least one destination.

16. The datastore of claim 12, wherein at least one hardware processor, selected from among said one or more hardware processors, is further configured for executing an online garbage collection process to remove said first tuple and said second tuple from said distributed datastore substantially after arrival of said second tuple at said at least one destination.

* * * * *